(12) United States Patent
Dekel et al.

(10) Patent No.: US 12,246,574 B2
(45) Date of Patent: Mar. 11, 2025

(54) WHEEL SUSPENSION SYSTEM WITH OFF-WHEEL-CENTER ARM

(71) Applicant: REE AUTOMOTIVE LTD, Galil-Yam (IL)

(72) Inventors: Ran Dekel, Nofit (IL); Gal Zohar, Kibbutz Ein-Shemer (IL); Eylon Avigur, Ramat Gan (IL); Amit Aknin, Karkom (IL); Ahishay Sardes, Tel Aviv (IL)

(73) Assignee: REE AUTOMOTIVE LTD, Glil-Yam (IL)

( * ) Notice: Subject to any disclaimer, the term of this patent is extended or adjusted under 35 U.S.C. 154(b) by 301 days.

(21) Appl. No.: 17/795,115

(22) PCT Filed: Jan. 28, 2021

(86) PCT No.: PCT/IL2021/050098
§ 371 (c)(1),
(2) Date: Jul. 25, 2022

(87) PCT Pub. No.: WO2021/152588
PCT Pub. Date: Aug. 5, 2021

(65) Prior Publication Data
US 2023/0150323 A1 May 18, 2023

Related U.S. Application Data

(60) Provisional application No. 62/966,575, filed on Jan. 28, 2020.

(51) Int. Cl.
*B60G 3/20* (2006.01)
*B60K 17/14* (2006.01)

(52) U.S. Cl.
CPC ............... *B60G 3/20* (2013.01); *B60K 17/14* (2013.01); *B60G 2200/13* (2013.01); *B60G 2200/42* (2013.01); *B60G 2206/60* (2013.01)

(58) Field of Classification Search
CPC .. B60G 3/20; B60G 2200/13; B60G 2200/42; B60G 2206/60; B60G 7/008;
(Continued)

(56) References Cited

U.S. PATENT DOCUMENTS

| | | |
|---|---|---|
| 429,331 A | 6/1890 | Wise |
| 1,283,083 A | 10/1918 | Coldwell |

(Continued)

FOREIGN PATENT DOCUMENTS

| | | |
|---|---|---|
| CN | 1579822 | 2/2005 |
| CN | 102892597 A | 1/2013 |

(Continued)

OTHER PUBLICATIONS

FR-2698825-A1 English Translation (Year: 1994).*
(Continued)

*Primary Examiner* — James A Shriver, II
*Assistant Examiner* — Michael T. Walsh
(74) *Attorney, Agent, or Firm* — PEARL COHEN ZEDEK LATZER BARATZ LLP

(57) ABSTRACT

A wheel suspension system can include a wheel interface having a wheel interface axis about which a wheel rotates when connected to the wheel interface, and an arm connected to the wheel interface and rotatable with respect to the wheel interface about a first axis, wherein the arm is connectable to a reference frame and rotatable with respect to the reference frame about a second axis. In some embodiments, the first axis and the second axis are offset with respect to the wheel interface axis. In some embodiments, the first axis and the second axis are off-parallel.

19 Claims, 7 Drawing Sheets

(58) Field of Classification Search
CPC .............. B60G 3/207; B60G 2200/422; B60G 2204/129; B60G 2204/30; B60G 2204/421; B60K 17/14; B60K 7/0007; B60T 1/065; B60Y 2400/86
See application file for complete search history.

(56) References Cited

U.S. PATENT DOCUMENTS

| | | | |
|---|---|---|---|
| 1,517,240 A | 12/1924 | Alberson | |
| 2,670,200 A | 2/1954 | Seddon | |
| 3,037,762 A | 6/1962 | Axtmann | |
| 3,174,771 A | 3/1965 | Miller | |
| 3,191,452 A | 6/1965 | Lipiski | |
| 3,397,589 A | 8/1968 | Graham | |
| 3,426,610 A | 2/1969 | Scharer | |
| 3,578,354 A | 5/1971 | Schott | |
| 4,180,222 A | 12/1979 | Thornberg | |
| 4,199,166 A | 4/1980 | Bohmer | |
| 4,353,677 A | 10/1982 | Susnjara | |
| 4,726,603 A | 2/1988 | Sugiyama | |
| 4,752,079 A | 6/1988 | Fahmer | |
| 4,834,408 A * | 5/1989 | de Cortanze | B62K 21/005 180/219 |
| 4,973,070 A | 11/1990 | Menichini | |
| 5,087,229 A | 2/1992 | Hewko | |
| 5,150,763 A | 9/1992 | Yamashita | |
| 5,156,414 A | 10/1992 | Fayard | |
| 5,161,813 A | 11/1992 | Yamashita | |
| 5,700,025 A | 12/1997 | Lee | |
| 5,784,542 A | 7/1998 | Ohm et al. | |
| 5,938,219 A | 8/1999 | Hayami | |
| 6,105,710 A | 8/2000 | Vandepitte | |
| 6,231,062 B1 | 5/2001 | Sutton | |
| 6,347,802 B1 | 2/2002 | Mackle | |
| 6,386,553 B2 | 5/2002 | Zetterstrom | |
| 6,464,030 B1 * | 10/2002 | Hanagan | B62D 7/142 180/211 |
| 6,688,620 B2 | 2/2004 | Serra | |
| 6,776,425 B2 | 8/2004 | Britton | |
| 6,974,138 B2 | 12/2005 | Perello | |
| 7,009,350 B1 | 3/2006 | Gold | |
| 7,222,863 B2 | 5/2007 | Deal | |
| 7,537,071 B2 | 5/2009 | Kamiya | |
| 7,537,223 B2 | 5/2009 | Zetterstroem | |
| 7,644,938 B2 | 1/2010 | Yamada | |
| 7,699,326 B2 | 4/2010 | Yamada | |
| 7,703,565 B2 | 4/2010 | Ikenoya | |
| 7,712,748 B2 | 5/2010 | Deal | |
| 7,730,988 B2 | 6/2010 | Igarashi et al. | |
| 7,766,345 B2 | 8/2010 | Hakui | |
| 7,770,677 B2 * | 8/2010 | Takenaka | B60G 3/14 280/124.125 |
| 7,793,946 B2 | 9/2010 | Vaxelaire | |
| 7,862,057 B2 | 1/2011 | Hilmann | |
| 7,958,959 B2 | 6/2011 | Yogo | |
| 7,988,158 B2 | 8/2011 | Liu | |
| 7,997,596 B2 | 8/2011 | Yuta | |
| 8,050,819 B2 | 11/2011 | Suyama | |
| 8,083,245 B2 | 12/2011 | Hatzikakidis | |
| 8,152,184 B2 | 4/2012 | Kuttner | |
| 8,152,185 B2 | 4/2012 | Siebeneick | |
| 8,162,332 B2 | 4/2012 | Michel | |
| 8,215,653 B2 | 7/2012 | Siebeneick | |
| 8,322,729 B2 | 12/2012 | Michel | |
| 8,424,880 B2 | 4/2013 | Horiguchi | |
| 8,463,506 B2 | 6/2013 | Yanagi | |
| 8,500,133 B2 | 8/2013 | Michel | |
| 8,690,177 B2 | 4/2014 | Buchwitz | |
| 8,714,574 B2 | 5/2014 | Glanzer | |
| 8,894,077 B2 | 11/2014 | Michel | |
| 8,910,952 B2 | 12/2014 | Yoo | |
| 8,943,916 B2 | 2/2015 | Osterlaenger | |
| 8,985,610 B2 * | 3/2015 | Juan | B60G 3/185 280/285 |
| 9,187,126 B2 | 11/2015 | Kawauchi | |
| 9,333,824 B2 | 5/2016 | Zandbergen | |
| 9,359,007 B2 | 6/2016 | Lee | |
| 9,446,642 B2 | 9/2016 | Stenzenberger | |
| 9,457,634 B2 | 10/2016 | Hansen | |
| 9,643,643 B2 | 5/2017 | Fujita | |
| 9,821,835 B2 | 11/2017 | Ferrer-Dalmau Nieto | |
| 10,112,649 B2 | 10/2018 | Rogers | |
| 10,160,486 B2 | 12/2018 | Kim | |
| 10,173,463 B2 | 1/2019 | Barel | |
| 10,351,173 B2 | 7/2019 | Schmid | |
| 10,668,950 B2 | 6/2020 | Kurita | |
| 10,717,333 B2 | 7/2020 | Mori | |
| 10,723,191 B1 * | 7/2020 | Sardes | B60G 3/207 |
| 10,806,106 B2 | 10/2020 | Olson | |
| 10,843,516 B2 | 11/2020 | Becker | |
| 10,946,706 B2 | 3/2021 | Sardes | |
| 10,988,177 B2 | 4/2021 | Rogers | |
| 11,021,027 B2 | 6/2021 | Sardes | |
| 11,046,134 B2 | 6/2021 | Raffaelli | |
| 11,230,150 B2 * | 1/2022 | Aknin | B60G 15/06 |
| 2001/0035623 A1 | 11/2001 | Wagner | |
| 2002/0036385 A1 | 3/2002 | Mackle | |
| 2005/0011296 A1 | 1/2005 | Koseki | |
| 2005/0017472 A1 | 1/2005 | Kondo | |
| 2005/0051976 A1 | 3/2005 | Blondelet | |
| 2005/0280241 A1 | 12/2005 | Bordini | |
| 2006/0012144 A1 * | 1/2006 | Kunzler | B60G 3/01 280/124.125 |
| 2006/0033301 A1 | 2/2006 | Roos | |
| 2008/0036168 A1 * | 2/2008 | Wagner | B60G 7/008 280/124.138 |
| 2008/0185807 A1 | 8/2008 | Takenaka | |
| 2009/0224501 A1 | 9/2009 | Carlson | |
| 2010/0052289 A1 | 3/2010 | Frey | |
| 2010/0276904 A1 | 11/2010 | Pavuk | |
| 2011/0095502 A1 | 4/2011 | Dada | |
| 2011/0130212 A1 | 6/2011 | Sholev | |
| 2011/0193302 A1 | 8/2011 | Horiguchi | |
| 2011/0209938 A1 | 9/2011 | Basadzishvili | |
| 2011/0260422 A1 | 10/2011 | Kuttner et al. | |
| 2012/0175857 A1 | 7/2012 | Mathis | |
| 2014/0251710 A1 | 9/2014 | Juan | |
| 2014/0300037 A1 | 10/2014 | Winshtein et al. | |
| 2015/0096823 A1 | 4/2015 | Raymond | |
| 2015/0191064 A1 * | 7/2015 | Gielisch | B60G 3/20 280/124.129 |
| 2015/0211478 A1 | 7/2015 | Dragic | |
| 2015/0217618 A1 | 8/2015 | Dorrestijn | |
| 2016/0068016 A1 | 3/2016 | Winshtein | |
| 2016/0075200 A1 * | 3/2016 | Hansen | B60K 7/00 280/124.153 |
| 2017/0120748 A1 | 5/2017 | Bandy | |
| 2017/0210435 A1 | 7/2017 | Lykken | |
| 2018/0072120 A1 * | 3/2018 | Hunter | B60K 7/0007 |
| 2019/0031276 A1 | 1/2019 | Weagle | |
| 2019/0048976 A1 | 2/2019 | Armstrong | |
| 2019/0126740 A1 | 5/2019 | Odaka | |
| 2019/0315171 A1 | 10/2019 | Wolf-Monheim | |
| 2020/0112239 A1 | 4/2020 | Hunter | |
| 2020/0215866 A1 | 7/2020 | Hoter Ishay | |
| 2022/0203787 A1 * | 6/2022 | Sardes | B60G 3/207 |

FOREIGN PATENT DOCUMENTS

| | | | |
|---|---|---|---|
| CN | 104210321 A | 12/2014 | |
| CN | 104640720 A | 5/2015 | |
| CN | 105431310 A | 3/2016 | |
| CN | 109515088 A | 3/2019 | |
| DE | 197 54 425 | 6/1999 | |
| DE | 102009059029 | 6/2011 | |
| DE | 102013013324 | 2/2015 | |
| DE | 10 2016 014004 | 5/2017 | |
| EP | 2005030 | 12/2008 | |
| FR | 1 273 251 | 10/1961 | |
| FR | 1273251 A * | 10/1961 | |
| FR | 2698825 | 6/1994 | |
| FR | 2698825 A1 * | 6/1994 | B60G 21/051 |
| GB | 1393187 | 5/1975 | |

(56) References Cited

FOREIGN PATENT DOCUMENTS

| | | | | |
|---|---|---|---|---|
| GB | 1393187 A | * | 5/1975 | ............ B60G 3/207 |
| GB | 2 247 063 | | 2/1992 | |
| GB | 9110086 | | 2/1992 | |
| IT | UB20 161 155 | | 8/2017 | |
| JP | S61-150607 U | | 1/1987 | |
| JP | 2007-062605 | | 3/2007 | |
| JP | 2013525177 | | 6/2013 | |
| JP | 2016-049883 | | 4/2016 | |
| JP | 6035939 | | 11/2016 | |
| JP | 2017001417 | | 1/2017 | |
| KR | 20070107738 | | 11/2007 | |
| WO | WO 2007/036234 | | 4/2007 | |
| WO | WO2007/114817 | | 10/2007 | |
| WO | WO 2011/133258 | | 10/2011 | |
| WO | WO 2018/104906 | | 6/2018 | |
| WO | WO 2020/008453 A1 | | 1/2020 | |

OTHER PUBLICATIONS

Office Action for Korean Appl. No. 10-2021-7001318 dated Nov. 29, 2022.

Office Action for U.S. Appl. No. 17/694,888, mailed Sep. 28, 2022.

\* cited by examiner

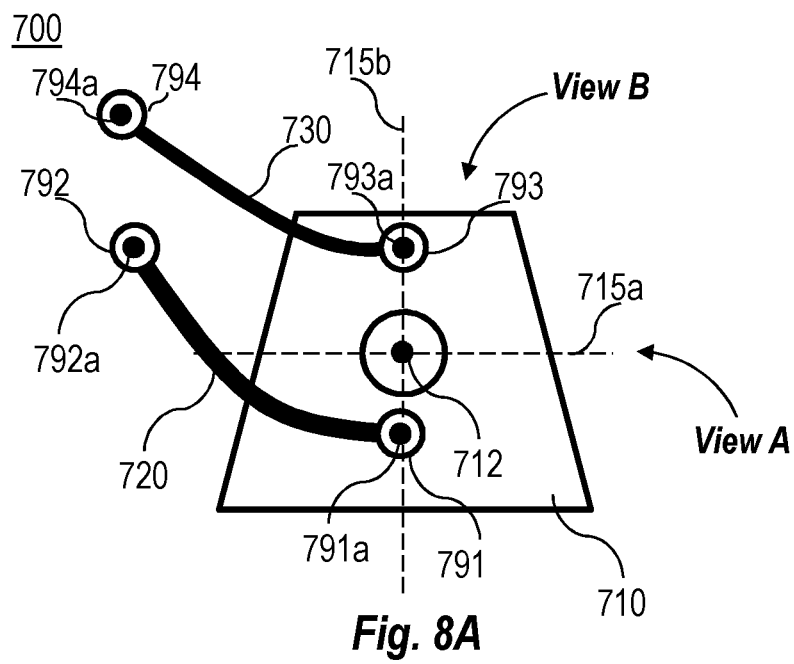
Fig. 8A
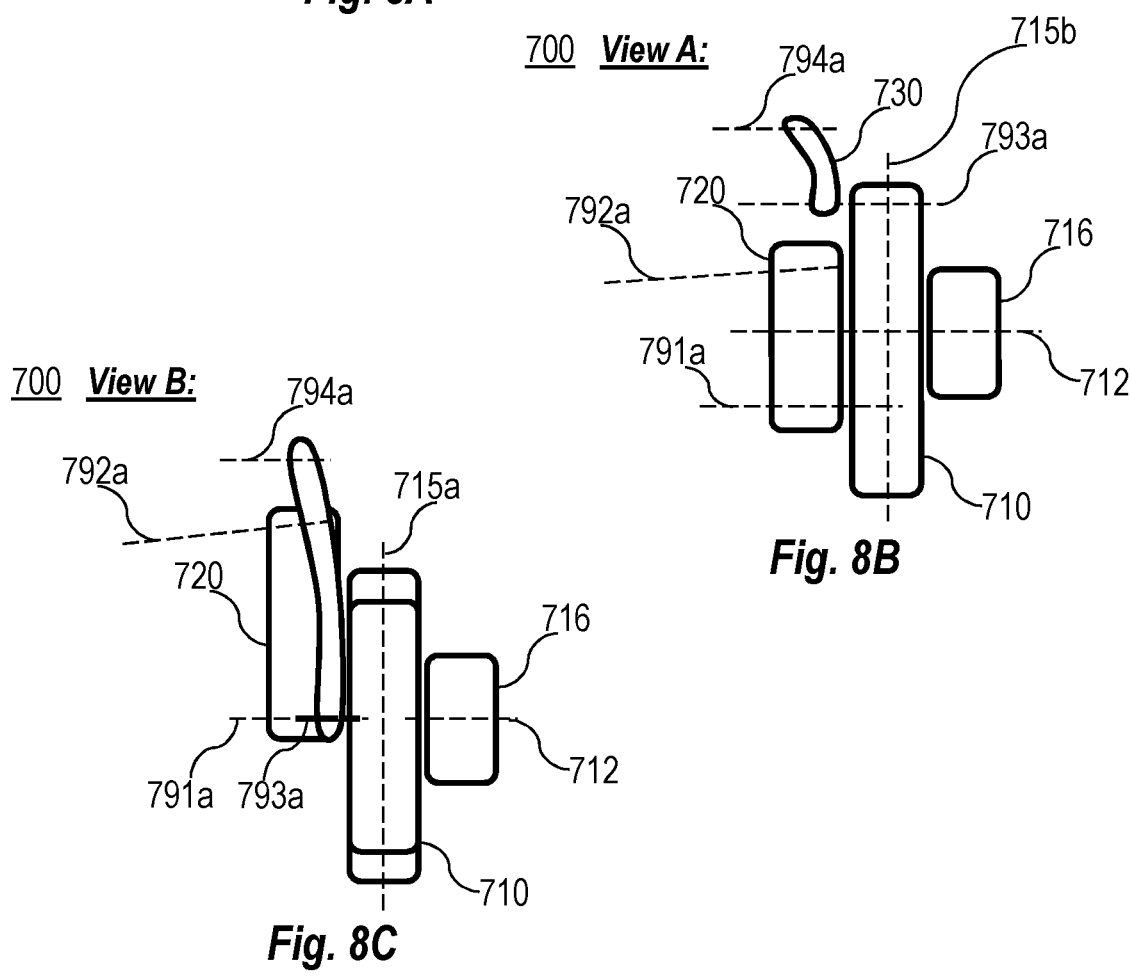
Fig. 8B
Fig. 8C

WHEEL SUSPENSION SYSTEM WITH OFF-WHEEL-CENTER ARM

CROSS-REFERENCE TO RELATED APPLICATIONS

This application is a National Phase Applications of PCT International Application No. PCT/IL2021/050098, International Filing Date Jan. 28, 2021, claiming the benefit of U.S. Provisional Application No. 62/966,575, filed Jan. 28, 2020, which are hereby incorporated by reference.

FIELD OF THE INVENTION

The present invention relates to the field of suspension systems, and more particularly, to wheel suspension systems.

BACKGROUND OF THE INVENTION

Vehicles can include a vehicle chassis, suspension system and vehicle wheels. Suspension systems can suspend a vehicle chassis to, for example, maintain a good grip of the vehicle wheels on the road while damping and/or absorbing road shocks and/or impacts. Typically, suspension systems can include suspension arms extending between a bottom portion of the vehicle chassis and vehicle wheels, wherein major portions of suspension arms are positioned external to rims of vehicle wheels. Some suspension systems have suspension arms that extend in a direction that is substantially parallel to vehicle wheel rotation axes. Some suspension systems have suspension arms that extend in a direction that is substantially perpendicular to vehicle wheel rotation axes.

SUMMARY OF THE INVENTION

Some embodiments of the present invention provide a wheel suspension system including: a wheel interface having a wheel interface axis about which a wheel rotates when connected to the wheel interface; and an arm connected to the wheel interface and rotatable with respect to the wheel interface about a first axis, the arm is connectable to a reference frame of a vehicle and rotatable with respect to the reference frame about a second axis; wherein the first axis and the second axis are offset with respect to the wheel interface axis.

In some embodiments, the first axis is offset with respect to the wheel interface axis along at least one axis that is perpendicular to the wheel interface axis.

In some embodiments, the second axis is offset with respect to the wheel interface axis along at least one axis that is perpendicular to the wheel interface axis.

In some embodiments, the wheel interface axis is between the first axis and the second axis along at least one axis that is perpendicular to the wheel interface axis.

In some embodiments, the first axis and the second axis are off-parallel with respect to each other.

In some embodiments, at least one of the first axis and the second axis are off-parallel with respect to the wheel interface axis.

In some embodiments, the wheel interface axis is movable along a substantially straight line.

In some embodiments, the arm and the wheel interface are shaped and sized, and the position of the first axis with respect to the wheel interface axis is set to cause the wheel interface axis to move along a substantially straight line.

In some embodiments, the wheel suspension system includes a linkage arm connected to the wheel interface and rotatable with respect to the wheel interface about a third axis, the linkage arm is connectable to the reference frame and rotatable with respect to the reference frame about a fourth axis.

In some embodiments, the third axis and the fourth axis are offset with respect to the wheel interface axis.

In some embodiments, the linkage arm is shaped and sized and the position of the third axis with respect to the wheel interface axis is set to cause the wheel interface axis to move along a substantially straight line.

In some embodiments, a distance between the first axis and the second axis is smaller than a diameter of a rim of a wheel to be assembled to the wheel suspension system.

In some embodiments, a distance between the first axis and the second axis is greater than a radius of a rim of a wheel to be assembled to the wheel suspension system.

In some embodiments, the arm is positioned in a plane that is substantially parallel to a plane that is perpendicular to the wheel interface axis.

In some embodiments, the arm is rotatable in a plane that is substantially perpendicular to the wheel interface axis.

In some embodiments, the arm is positioned within a diameter of a rim of a wheel when the wheel is assembled to the wheel suspension system.

In some embodiments, a ratio between (i) a distance between the first axis and the second axis, and (ii) a maximal substantially linear travel distance of the wheel interface axis ranges between 40% and 70%.

In some embodiments, a ratio between (i) a distance between the first axis and the wheel interface axis and (ii) a distance between the first axis and the second axis ranges between 10% and 55%.

In some embodiments, a ratio between (i) a distance between the first axis and the second axis, and (ii) a diameter of a rim of a wheel to be assembled to the wheel suspension system ranges between 50% and 90%.

In some embodiments, the wheel suspension system includes a motion restraining unit, wherein the motion restraining unit comprises at least one spring and at least one damper, and wherein the motion restrainer unit interconnecting at least one of the wheel interface and the arm with the reference frame.

Some embodiments of the present invention provide a vehicle including two or more wheel suspension systems described hereinabove.

Some embodiments of the present invention provide a corner assembly including: a sub-frame to connect the corner assembly to a reference frame of a vehicle; a wheel interface having a wheel interface axis; a wheel hub connected to the wheel interface and rotatable with respect to the wheel interface about the wheel interface axis, wherein the wheel interface axis is an axis about which the wheel rotates when connected to the wheel hub; and an arm connected to the wheel interface and rotatable with respect to the wheel interface about a first axis, the arm is connectable to the sub-frame and rotatable with respect to the sub-frame about a second axis; wherein the first axis and the second axis are offset with respect to the wheel interface axis.

In some embodiments, the corner assembly includes a brake unit, the braking unit includes: a braking disc connected to the wheel hub, and a braking actuator connected to the wheel interface and acting on the braking disc.

In some embodiments, the corner assembly includes a powertrain unit, the powertrain unit includes a drivetrain shaft connected to the wheel hub to rotate the wheel hub about the wheel interface axis.

In some embodiments, the powertrain unit includes a motor for generating rotations, wherein the motor is coupled to the drivetrain shaft to rotate the drivetrain shaft.

In some embodiments, the drivetrain shaft and the motor are positioned between the wheel interface and the sub-frame.

In some embodiments, the motor is connected to the sub-frame.

Some embodiments of the present invention provide a vehicle including two or more corner assemblies described hereinabove.

Some embodiments of the present invention provide a wheel suspension system including: a wheel interface having a wheel interface axis about which a wheel rotates when connected to the wheel interface; and an arm connected to the wheel interface and rotatable with respect to the wheel interface about a first axis, the arm is connectable to a reference frame and rotatable with respect to the reference frame about a second axis; wherein the first axis and the second axis are off-parallel.

In some embodiments, the first axis is parallel to the wheel interface axis.

In some embodiments, the second axis is off-parallel with respect to the wheel interface axis.

In some embodiments, the wheel suspension system includes a linkage arm connected to the wheel interface and rotatable with respect to the wheel interface about a third axis, the linkage arm is connectable to the reference frame and rotatable with respect to the reference frame about a fourth axis.

In some embodiments, the third axis and the fourth axis are offset with respect to the wheel interface axis.

In some embodiments, the linkage arm is shaped and sized and the position of the third axis with respect to the wheel interface axis is set to cause the wheel interface axis to move along a substantially straight line.

In some embodiments, the wheel suspension system includes a motion restraining unit, wherein the motion restraining unit comprises at least one spring and at least one damper, and wherein the motion restrainer unit interconnecting at least one of the wheel interface and the arm with the reference frame.

Some embodiments of the present invention provide a vehicle including two or more wheel suspension systems described hereinabove.

Some embodiments of the present invention provide a corner assembly including: a sub-frame to connect the corner assembly to a reference frame of a vehicle; a wheel interface having a wheel interface axis; a wheel hub connected to the wheel interface and rotatable with respect to the wheel interface about the wheel interface axis, wherein the wheel interface axis is an axis about which the wheel rotates when connected to the wheel hub; and an arm connected to the wheel interface and rotatable with respect to the wheel interface about a first axis, the arm is connectable to the sub-frame and rotatable with respect to the sub-frame about a second axis; wherein the first axis and the second axis are off-parallel.

In some embodiments, the corner assembly includes a brake unit, the braking unit includes: a braking disc connected to the wheel hub, and a braking actuator connected to the wheel interface and acting on the braking disc.

In some embodiments, the corner assembly includes a powertrain unit, the powertrain unit includes a drivetrain shaft connected to the wheel hub to rotate the wheel hub about the wheel interface axis.

In some embodiments, the powertrain unit comprises a motor for generating rotations, wherein the motor is coupled to the drivetrain shaft to rotate the drivetrain shaft.

In some embodiments, the drivetrain shaft and the motor are positioned between the wheel interface and the sub-frame.

In some embodiments, the motor is connected to the sub-frame.

Some embodiments of the present invention provide a vehicle including two or more corner assemblies described hereinabove.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 8A, 8B and 8C are schematic illustrations of a wheel suspension system, according to some embodiments of the invention.

Figure 1A:
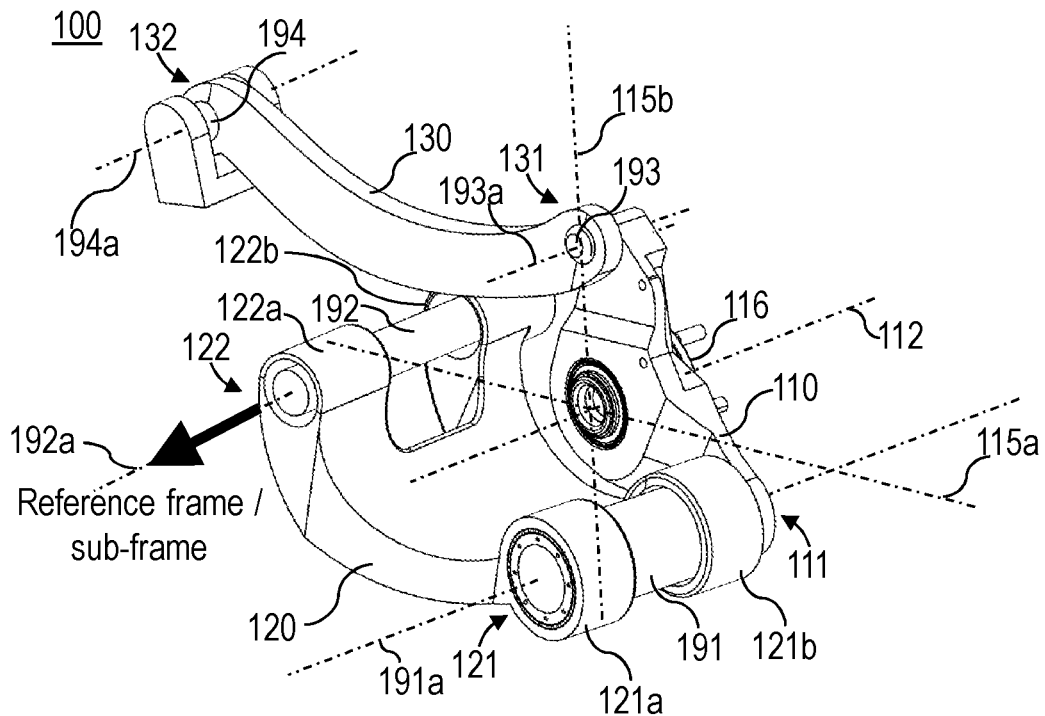
FIGS. 1A and 1B are schematic illustrations of a wheel suspension system, according to some embodiments of the invention.

It will be appreciated that, for simplicity and clarity of illustration, elements shown in the figures have not necessarily been drawn to scale. For example, the dimensions of some of the elements can be exaggerated relative to other elements for clarity. Further, where considered appropriate, reference numerals can be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Suspension systems can suspend a vehicle chassis to maintain a good grip of vehicle wheels on the road while damping and/or absorbing road shocks and/or impacts. Various embodiments of the present invention can include wheel suspension systems having one or more suspension arms positioned within a diameter of a rim of a wheel when the wheel is, for example, assembled to the wheel suspensions system. Such wheel suspension systems have several advantages over typical suspension systems having suspension arms positioned external to the rim of the wheel. For example, wheel suspension systems can reduce the weight of the vehicle chassis as compared to typical suspension systems, while providing competitive suspension performance parameters. Wheel suspension systems of the present invention can, for example, damp each wheel separately such that the damping of one wheel does not cause a damping effect on other wheels of the vehicle. Wheel suspension systems of the present invention can, for example, free a significant space beneath, in front, or back of the vehicle chassis or wheel corner as compared to typical suspension systems.

Figure 1B:
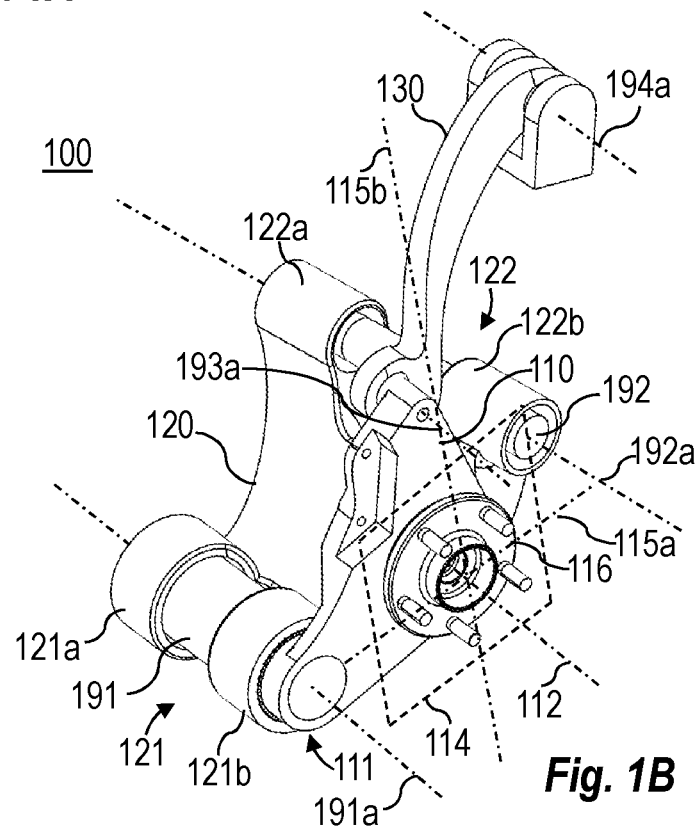

Reference is now made to FIGS. 1A and 1B, which are schematic illustrations of a wheel suspension system 100, according to some embodiments of the invention.

According to some embodiments of the invention, wheel suspension system 100 includes a wheel interface 110 and an arm 120.

Wheel interface 110 can connect to a wheel. Wheel interface 110 can have a wheel interface axis 112 about which the wheel can rotate when assembled to wheel interface 110. Wheel interface 110 can have a wheel interface plane 114 in which the wheel can rotate when the wheel is assembled to wheel interface 110.

In some embodiments, wheel suspension system 100 includes a wheel hub 116 connected to wheel interface 110 and rotatable about wheel interface axis 112. Wheel hub 116 can connect to the wheel.

Arm 120 can be connected to wheel interface 110 and can be rotatable with respect to wheel interface 110 about a first axis 191a. In some embodiments, arm 120 is connected to wheel interface 110 at its first end 121. In some embodiments, arm 120 is connected to wheel interface 110 using a first pivoting connection 191.

In some embodiments, arm 120 is connectable to a reference frame of a vehicle and rotatable with respect to the reference frame about a second axis 192a. The reference frame may be, for example, a vehicle chassis, a vehicle platform, etc. In some embodiments, arm 120 is connectable to the reference frame at its second end 122. In some embodiments, arm 120 is connectable to the reference frame using a second pivoting connection 192.

First axis 191a can be offset with respect to wheel interface axis 112. First axis 191a can be offset with respect to wheel interface axis 112 along one or more axes that are perpendicular (or substantially perpendicular) to wheel interface axis 112. In some embodiments, first axis 191a is offset with respect to wheel interface axis 112 along an axis 115a that is parallel (or substantially parallel) to a vehicle longitudinal axis (not shown) when wheel suspension system is assembled to the vehicle. In some embodiments, first axis 191a is offset with respect to wheel interface axis 112 along an axis 115b that is parallel (or substantially parallel) to a vehicle vertical axis when wheel suspension system 100 is assembled to the vehicle. In some embodiments, first axis 191a is offset with respect to wheel interface axis 112 along axis 115a that is substantially parallel to the vehicle longitudinal axis and along axis 115b that is parallel (or substantially parallel) to the vehicle vertical axis when wheel suspension system 100 is assembled to the vehicle (e.g., as shown in FIGS. 1A and 1B).

In some embodiments, wheel interface 110 is shaped to cause the offset of first axis 191a with respect to wheel interface axis 112. For example, wheel interface 110 may include an extended portion 111 that may extend radially away from wheel interface axis 112 and may include first axis 191a (e.g., as shown in FIGS. 1A and 1B). In this manner, first axis 191a can be distanced from wheel interface axis 112 and not co-located therewith. In some embodiments, first axis 191a is offset with respect to wheel interface axis 112 along one or more axes perpendicular to wheel interface axis 112 (e.g., such as axes 115a, 115b) and towards a contact surface of the wheel with the ground when the wheel is assembled to wheel suspension system 100 (e.g., as shown in and described below with respect to FIGS. 6 and 7).

In some embodiments, arm 120 is shaped to cause the offset of first axis 191a with respect to wheel interface axis 112. For example, arm 120 can include an extended portion extending transversally to a general direction of arm 120. Yet, in this example, the transversally extended portion of arm 120 can be coupled to wheel interface 110 such that first axis 191a is positioned at a distance from an end of the transversally extended portion thereof.

In some embodiments, wheel suspension system 100 includes an offset linkage. The offset linkage can interconnect wheel interface 110 with, for example, first end 121 of arm 120. In this manner, first end 121 of arm 120 can be assembled at a distance from wheel interface axis 112 by positioning first axis 191a (and first pivoting connection 191) at the offset linkage.

Second axis 192a can be offset with respect to wheel interface axis 112. Second axis 192a can be offset with respect to wheel interface axis 112 along one or more axes that are perpendicular (or substantially perpendicular) to wheel interface axis 112. In some embodiments, second axis 192a is offset with respect to wheel interface axis 112 along axis 115a that is parallel (or substantially parallel) to the vehicle longitudinal axis when wheel suspension system 100 is assembled to the vehicle. In some embodiments, second axis 192a is offset with respect to wheel interface axis 112 along axis 115b that is parallel (or substantially parallel) to the vehicle vertical axis when wheel suspension system 100 is assembled to the vehicle. In some embodiments, second axis 192a is offset with respect to wheel interface axis 112 along axis 115a that is parallel (or substantially parallel) to the vehicle longitudinal axis and along axis 115b that is parallel (or substantially parallel) to the vehicle vertical axis when wheel suspension system 100 is assembled to the vehicle (e.g., as shown in FIGS. 1A and 1B).

In some embodiments, wheel interface axis 112 is positioned between first axis 191a and second axis 192a (e.g., as shown in FIGS. 1A and 1B). In some embodiments, wheel interface axis 112 is positioned between first axis 191a and second axis 192a along axis 115a that is parallel (or substantially parallel) to the vehicle longitudinal axis when wheel suspension system 100 is assembled to the vehicle. In some embodiments, wheel interface axis 112 is positioned between first axis 191a and second axis 192a along axis 115b that is parallel (or substantially parallel) to the vehicle vertical axis when wheel suspension system 100 is assembled to the vehicle. In some embodiments, wheel interface axis 112 is positioned between first axis 191a and second axis 192a along axis 115a that is parallel (or substantially parallel) to the vehicle longitudinal axis and along axis 115b that is parallel (or substantially parallel) to the vehicle vertical axis when wheel suspension system 100 is assembled to the vehicle (e.g., as shown in FIGS. 1A and 1B).

In some embodiments, first axis 191a is parallel (or substantially parallel) to wheel interface axis 112. In some embodiments, first axis 191a is off-parallel with respect to wheel interface axis 112.

In some embodiments, second axis 192a is parallel (or substantially parallel) to wheel interface axis 112. In some embodiments, second axis 192a is off-parallel with respect to wheel interface axis 112.

In some embodiments, second axis 192a and first axis 191a are off-parallel (e.g., second axis 192a and first axis 191a are non-parallel). This can, for example, enable setting a dynamic toe angle and/or a dynamic camber angle in wheel suspension system 100.

In various embodiments, first pivoting connection 191 and/or second pivoting connection 192 can include at least one of: one or more bushings, one or more bearings, and one or more spherical joints. In various embodiments, first pivoting connection 191 can include two connection points 121a, 121b and/or second pivoting connection 192 can include two connection points 122a, 122b. This can, for example, increase structural rigidity of first and second pivoting connections 191, 192. This can, for example, increase loads that arm 120 and first and second pivoting connections 191, 192 can sustain (e.g., side loads applied by the wheel when the wheel is assembled to wheel suspension system 100).

In some embodiments, arm 120 is rotatable in a plane that is parallel (or substantially parallel) to wheel interface plane 114. In some embodiments, arm 120 extends longitudinally in a general direction of a plane that is parallel (or substantially parallel) to wheel interface plane 114.

In some embodiments, wheel interface 110 and arm 120 are shaped and sized, and the position of first axis 191a with respect to wheel interface axis 112 is set to cause a linear motion (or substantially linear motion) of wheel interface axis 112. In some embodiments, wheel interface 110 and arm 120 are shaped and sized, and the position of first axis 191a with respect to wheel interface axis 112 is set to cause a linear motion (or substantially linear motion) of wheel interface axis 112 along axis 115b that is parallel (or substantially parallel) to the vehicle vertical axis when wheel suspension system 100 is assembled to the vehicle.

In some embodiments, wheel interface axis 112 is movable along a substantially straight line. In some embodiments, wheel interface axis 112 is movable along a substantially straight line that is parallel to the vehicle vertical axis when wheel suspension system 100 is assembled to the vehicle. In some embodiments, wheel interface 110 and arm 120 are shaped and sized, and the position of first axis 191a with respect to wheel interface axis 112 is set to cause wheel interface axis 112 to move along a substantially straight line.

In some embodiments, arm 120 is positioned within a diameter of the rim of the wheel when the wheel is assembled to wheel suspension system 100. In some embodiments, arm 120 is shaped and sized to be positioned within a diameter of the rim of the wheel when the wheel is assembled to wheel suspension system 100 (e.g., without radially protruding external thereto). In some embodiments, arm 120 has a curved, e.g., substantially arc-like shape. In some embodiments, the length of arm 120 is smaller than the diameter of the rim of the wheel to be assembled to wheel suspension system 100. In some embodiments, the length of arm 120 is greater than a radius of the rim of the wheel to be assembled to wheel suspension system 100. In various embodiments, offsetting first axis 191a and second axis 192a enables arm 120 to be positioned within a diameter of the rim of the wheel when the wheel is assembled to wheel suspension system 100.

In some embodiments, at least one of: a shape of arm 120, a length of arm 120 and a distance between first axis 191a and second axis 192a are set based on a diameter of the rim of the wheel to be assembled to wheel suspension system 100 to provide a desired maximal substantially linear travel distance of wheel interface axis 112.

In some embodiments, a ratio between (i) the distance between first axis 191a and second axis 192a and (ii) the desired maximal substantially linear travel distance of wheel interface 110/wheel interface axis 112 ranges between 40% and 70%.

In some embodiments, a ratio between (i) the distance between first axis and wheel interface axis 112 and (ii) the distance between first axis 191a and second axis 192a ranges between 10% and 55%.

In some embodiments, a ratio between (i) the distance between first axis 191a and second axis 192a and (ii) the diameter of the rim of the wheel to be assembled to wheel suspension system 100 ranges between 50% and 90%.

In some embodiments, a width of wheel suspension system 100 is a maximal distance between an inner lateral surface of arm 120 (e.g., surface that faces the reference frame of the vehicle) and an outer surface of wheel interface 110 (e.g., surface that faces the wheel). In some embodiments, the width of wheel suspension system 100 ranges between 20% and 60% (e.g., 25% to 40%) of the maximal substantially linear travel distance of wheel interface axis 112.

Such ratios can, for example, provide a compact arm 120 that can be positioned within the rim of the wheel when the wheel is connected to wheel suspension system 100 and provide substantially the same maximal travel distance of wheel interface 110/wheel interface axis 112 as a maximal travel distance thereof in typical suspension systems having suspension arms outside the rim of the wheel, even though arm 120 of wheel suspension 110 can be significantly shorter than suspension arms of typical suspension systems.

For example, for a rim having an outer diameter of 16 inches (e.g., ~406.4 mm), a maximal substantially linear travel distance of wheel interface axis 112 can range between 120 mm and 180 mm (e.g., between 140 mm and 160 mm). Yet, in this example, the distance between first axis 191a and second axis 192a can range between 200 mm and 300 mm. Yet, in this example, the width of wheel suspension system 100 can range between 25 mm and 70 mm (e.g., between 35 mm and 50 mm).

Configuring arm 120 to rotate in a plane that is parallel (or substantially parallel) to wheel interface plane 114 and configuring arm 120 to be positioned within the diameter of the rim of the wheel (e.g., as described hereinabove) can provide a compact wheel suspension system 100. Wheel suspension system 100 can, for example, eliminate a need in positioning and/or extending different components of wheel suspension system 100 beneath/above/into a vehicle chassis, without reducing (or substantially without reducing) a maximal substantially linear travel distance of wheel interface 110/wheel interface axis 112 with respect to the reference frame of the vehicle.

Offsetting first axis 191a with respect to wheel interface axis 112 in wheel suspension 110 can enable substantially the same maximal travel distance of wheel interface 110/ wheel interface axis 112 as a maximal travel distance thereof in typical suspension systems having suspension arms outside the rim of the wheel, even though arm 120 of wheel suspension 110 can be significantly shorter than suspension arms of typical suspension systems.

In some embodiments, wheel suspension system 100 can include a linkage arm 130. Linkage arm 130 can be connected to wheel interface 110 and can be rotatable with respect to wheel interface about a third axis 193a. In some embodiments, linkage arm 130 is connected to wheel interface 110 using a third pivoting connection 193. In some embodiments, linkage arm 130 is connected to wheel interface 130 at its first end 131.

Linkage arm 130 can be connectable to the reference frame of the vehicle and rotatable with respect to the reference frame about a fourth axis 194a. In some embodiments, linkage arm 130 is connectable to the reference frame using a fourth pivoting connection 194. In some embodiments, linkage arm 130 is connectable to the reference frame at its second end 132.

In some embodiments, third axis 193a is offset with respect to wheel interface axis 112 along axis 115b that is parallel (or substantially parallel) to the vehicle vertical axis when wheel suspension system 100 is assembled to the vehicle. In some embodiments, third axis 193 is aligned (or substantially aligned) with wheel interface axis 112 along axis 115b that is parallel (or substantially parallel) to the vehicle vertical axis when wheel suspension system 100 is assembled to the vehicle. In some embodiments, wheel interface axis 112 is between first axis 191a and third axis 193a along axis 115b that is parallel (or substantially parallel) to the vehicle vertical axis when wheel suspension system 100 is assembled to the vehicle.

In some embodiments, fourth axis 194a is offset with respect to wheel interface axis 112 along axis 115a that is parallel (or substantially parallel) to the vehicle longitudinal axis and along axis 115b that is parallel (or substantially parallel) to the vehicle vertical axis when wheel suspension system is assembled to the vehicle (e.g., as shown in FIGS. 1A and 1B). In some embodiments, second axis 192a is between fourth axis 194a and wheel interface axis 112 along axis 115a that is parallel (or substantially parallel) to the vehicle longitudinal axis when wheel suspension system is assembled to the vehicle (e.g., as shown in FIGS. 1A and 1B). In some embodiments, third axis 193a is between fourth axis 194a and wheel interface axis 112 along axis 115b that is parallel (or substantially parallel) to the vehicle vertical axis when wheel suspension system is assembled to the vehicle (e.g., as shown in FIGS. 1A and 1B).

In some embodiments, third pivoting connection 193 includes at least one of: one or more bushings and one or more spherical joints. In some embodiments, fourth pivoting connection 194 includes at least one of: one or more bushings and one or more spherical joints. Bushing(s) and/or spherical joint(s) can cause third axis 193a and/or fourth axis 194a to change their orientation with respect to wheel interface axis 112 when wheel interface 110 moves (e.g., to prevent over restraining of wheel suspension 100).

Linkage arm 130 can, for example, restrict motion of wheel interface 110. For example, linkage arm 130 can close one or more degrees of freedom of wheel interface 110 to cause wheel interface 110 to move in a plane that is parallel (or substantially parallel) to wheel interface plane 114 and eliminate, or substantially eliminate, motion of wheel interface 110 in other planes. Linkage arm 130 may, for example, constrain the rotation of wheel interface 110 about first axis 191a.

In various embodiments, linkage arm 130 causes a substantially linear motion of wheel interface axis 112 and/or causes wheel interface axis 112 to move along a substantially straight line. For example, linkage arm 130 can be shaped and sized, and the position of third axis 193a with respect to wheel interface axis 112 can be set to cause a substantially linear motion of wheel interface axis 112 and/or to cause wheel interface axis 112 to move along a substantially straight line (e.g., additionally or complementary, to features described hereinabove as causing the substantially linear motion). For example, offsetting third axis 193a with respect to wheel interface axis 112 (e.g., as shown in FIGS. 1A and 1B) can constrain the rotation of wheel interface 110 about first axis 191a so as to cause a substantially linear motion of wheel interface axis 112 and/or to cause wheel interface axis 112 to move along a substantially straight line.

In some embodiments, linkage arm 130 has a curved shape. In some embodiments, linkage arm 130 is curved in two perpendicular planes (e.g., one of which is parallel to wheel interface plane 114).

The substantially linear motion of wheel interface axis 112 of wheel suspension system 100 can slightly vary from a straight line that is parallel to the vehicle vertical axis. For example, wheel interface axis 112 can move along an arc-like path wherein a maximal distance between the arc-like path and the straight line parallel to the vehicle vertical axis can range between 10-30% of the maximal wheel interface 110 travel distance. For example, a maximal wheel interface 110 travel distance of 130 mm, the maximal distance between the arc-like path and the straight line parallel to the vehicle vertical axis can be 30 mm. This variation of substantially linear motion of wheel interface axis 112 of wheel suspension system 100 from the straight line that is parallel to the vehicle vertical axis is similar to variation in typical suspension systems having suspension trailing or leading arms extending outside the rim of the wheel, even though arm 120 of wheel suspension 110 can be significantly shorter than suspension arms of these typical trailing or leading arms suspension systems.

Figure 2A:
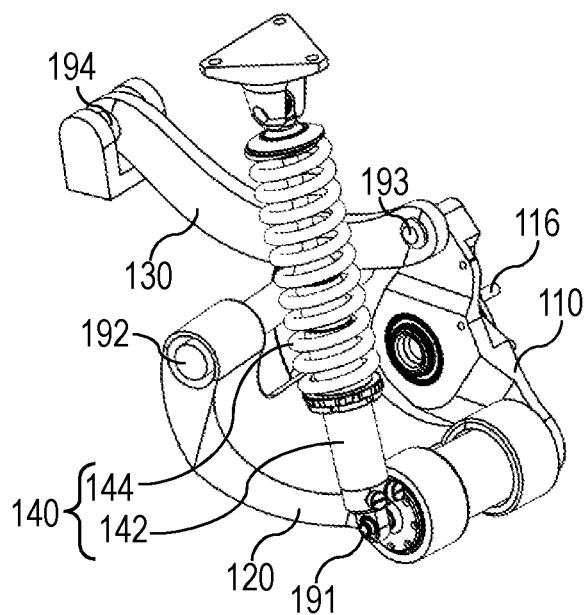
FIGS. 2A and 2B are schematic illustrations of a wheel suspension system including a motion restraining unit, according to some embodiments of the invention.
Figure 2B:
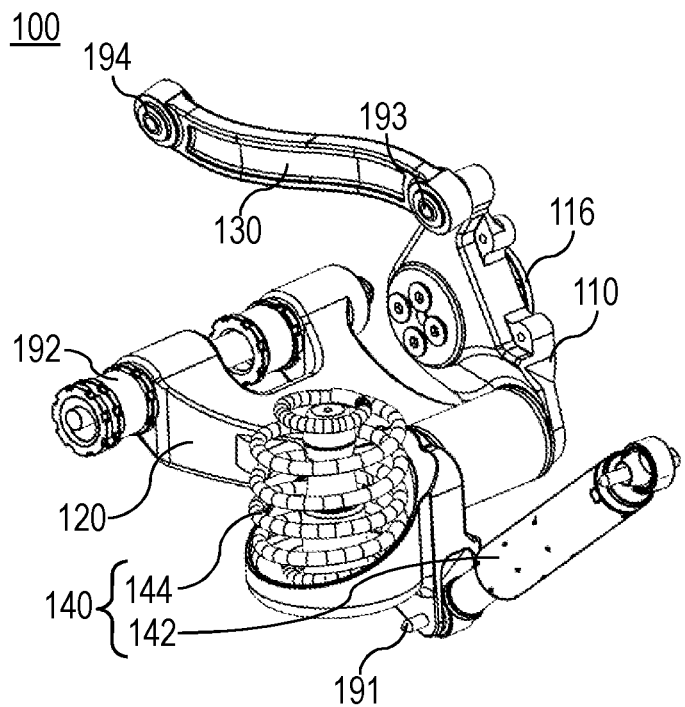

Reference is now made to FIGS. 2A and 2B, which are schematic illustrations of a wheel suspension system 100 including a motion restraining unit 140, according to some embodiments of the invention.

In some embodiments, wheel suspension system 100 includes a motion restraining unit 140. Motion restraining unit 140 can include at least one damper 142 and at least one spring 144. In some embodiments, motion restraining unit 140 includes a spring damper (e.g., as shown in FIG. 3A). In some embodiments, damper 142 and spring 144 are spatially separated (e.g., shown in FIG. 3B).

Motion restraining unit 140 can interconnect at least one of: wheel interface 110 and arm 120, with at least one of: the reference frame of the vehicle and a sub-frame of a corner assembly (e.g., sub-frame 205 of corner assembly 200 as described below with respect to FIG. 2). For example, motion restrainer unit 140 can be connected to wheel interface 110 and arm 120 using first pivoting connection 191 (e.g., as shown in FIGS. 2A and 2B). Other connections are also possible.

Figure 3:
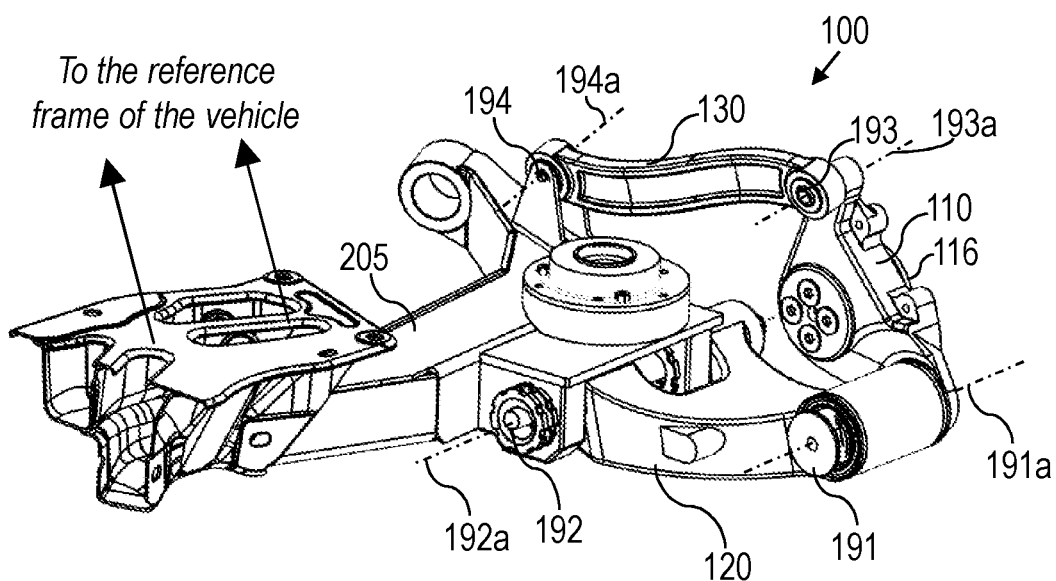
FIG. 3 is a schematic illustration of a corner assembly including a wheel suspension system including a sub-frame, according to some embodiments of the invention.

Reference is now made to FIG. 3, which is a schematic illustration of a corner assembly 200 including a wheel suspension system 100 and a sub-frame 205, according to some embodiments of the invention.

According to some embodiments of the invention, corner assembly 200 includes a sub-frame 205 and wheel suspension system 100.

Sub-frame 205 can be a structural element can that connects corner assembly 200 to the reference frame of the vehicle. In some embodiments, arm 120 of wheel suspension system 100 is connected to sub-frame 205 (e.g., using second pivoting connection 192) and rotatable with respect to sub-frame 205 about second axis 192a. In some embodiments, linkage arm 130 is connected to sub-frame 205 (e.g., using fourth pivoting connection 194) and rotatable with respect to sub-frame 205 about fourth axis 194a.

Figure 4:
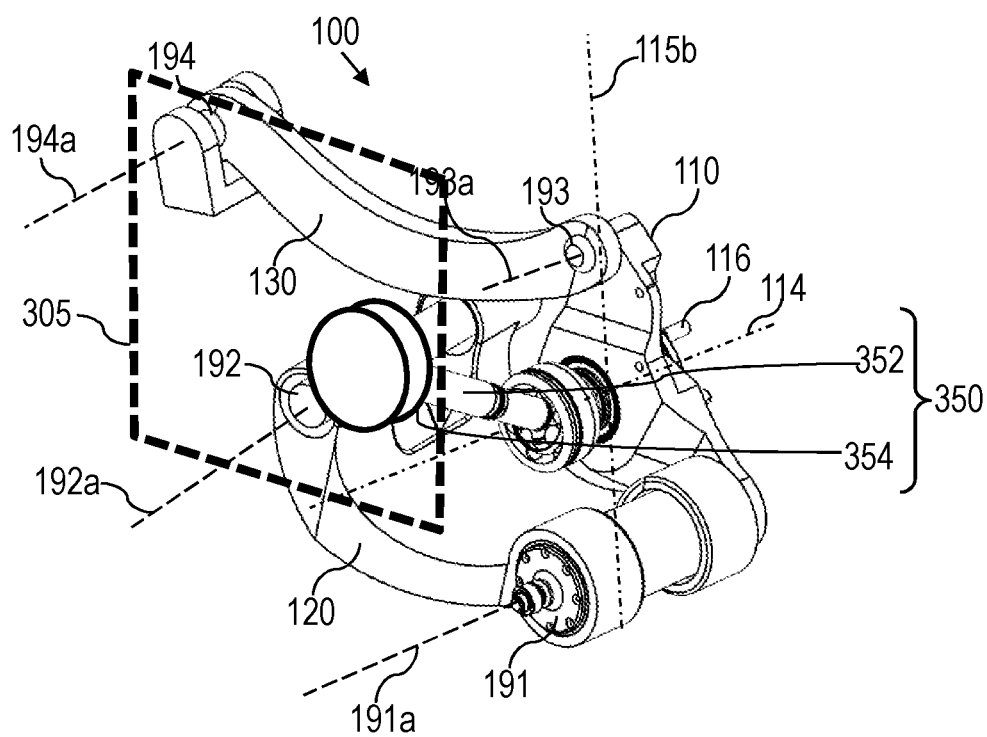
FIG. 4 which is a schematic illustration of a corner assembly including a wheel suspension system and a powertrain unit, according to some embodiments of the invention.

Reference is now made to FIG. 4, which is a schematic illustration of a corner assembly 300 including a wheel suspension system 100, a sub-frame 305 and a powertrain unit 350, according to some embodiments of the invention.

According to some embodiments of the invention, corner assembly 200 includes wheel suspension system 100 (e.g., as described above with respect to FIGS. 1A and 1B, and FIGS. 2A and 2B), a sub-frame 305 and a powertrain unit 350.

Sub-frame 305 is schematically shown in FIG. 4 as dashed rectangular. Sub-frame 305 can have different shapes and dimensions. For example, sub-frame 305 can be similar to sub-frame 205 described above and shown in FIG. 3. Wheel suspension system 100 can be connected to sub-frame 305 (e.g., as described above with respect to FIG. 3).

In some embodiments, powertrain unit 350 includes a drivetrain shaft 352. Drivetrain shaft 352 can be connected to wheel hub 116 of wheel suspension system 100 and can rotate wheel hub 116 while enabling the substantially linear motion of wheel interface axis 112. Drivetrain shaft 352 can extend between sub-frame 305 and wheel hub 116 through wheel suspension system 100. Drivetrain shaft 352 can, for example, restrict motion of wheel interface 110 by, for example, closing one or more degrees of freedom of wheel interface 110.

In some embodiments, powertrain unit 350 includes a motor 354 for generating rotational motions. Motor 354 can be coupled to the drivetrain shaft 352 to rotate drivetrain shaft 352. In some embodiments, motor 354 is positioned within a volume defined by wheel suspension system 100. For example, motor 354 can be positioned within a volume between sub-frame 305 and wheel interface 310 of wheel suspension unit 100. In some embodiments, motor 354 is connected to sub-frame 305. In some embodiments, motor 354 is an electrical motor.

In some embodiments, powertrain unit 350 includes a transmission sub-unit for transferring the rotational motions from motor 354 to drivetrain shaft 352. The transmission sub-unit can include at least one of: one or more gears, and one or more transmission belts, etc.

An advantage of wheel suspension system 100 having first axis 191a offset with respect to wheel interface axis 112 can be a space formed in wheel suspension system 100 that can be used, e.g., for extending a drivetrain shaft 352 through wheel suspension system 100 and/or for locating components of powertrain unit 350 within such space.

Figure 5:
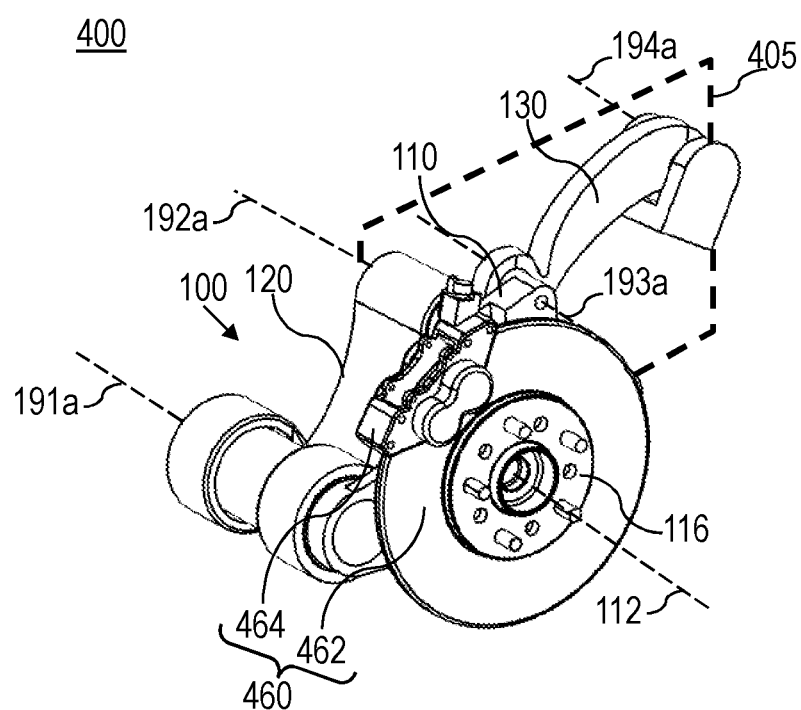
FIG. 5 is a schematic illustration of a corner assembly including a wheel suspension system and a braking unit, according to some embodiments of the invention.

Reference is now made to FIG. 5, which is a schematic illustration of a corner assembly 400 including a wheel suspension system 100, a sub-frame 405 and a braking unit 460, according to some embodiments of the invention.

According to some embodiments of the invention, corner assembly 400 includes wheel suspension system 100 (e.g., described hereinabove with respect to FIGS. 1A and 1B, and FIGS. 2A and 2B), a sub-frame 405 (e.g., such as sub-frame 205 or 305 described hereinabove) and a braking unit 460.

Braking unit 460 can include a braking disc 462 and a breaking actuator 464. Braking disc 462 can be connected to wheel hub 116 of wheel suspension system 100. Braking actuator 464 can be connected to, for example, wheel interface 110 of wheel suspension system 100 and can embrace braking disc 462 and act on braking disc 462. Braking actuator 146464 can be, for example, a caliper.

Figure 6:
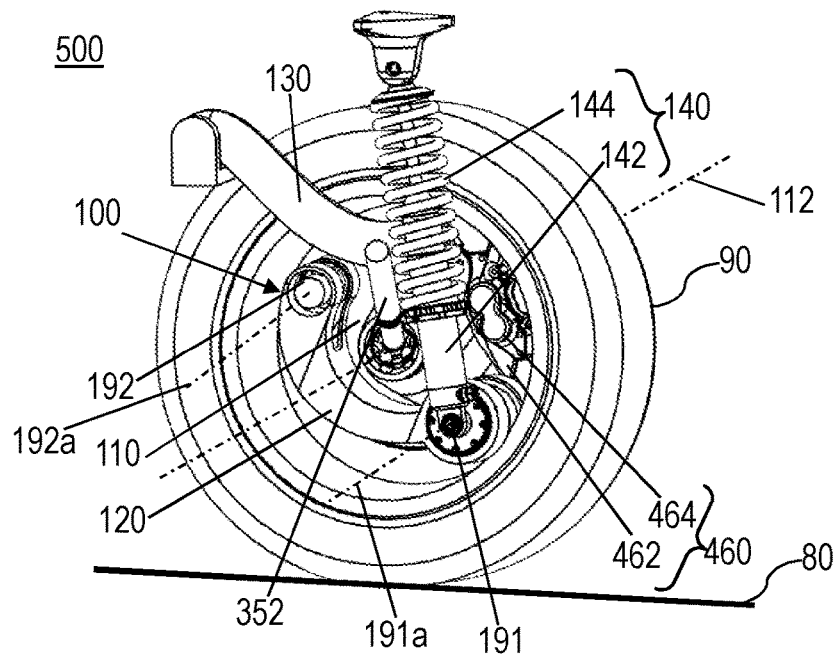
FIG. 6 is a schematic illustration of a corner assembly including a wheel suspension system with a motion restraining unit, a drivetrain shaft and a braking unit, and of a wheel assembled to the wheel suspension system, according to some embodiments of the invention.

Reference is now made to FIG. 6, which is a schematic illustration of a corner assembly 500 including a wheel suspension system 100, with a motion restraining unit 140, a drivetrain shaft 352 and a braking unit 460, and of a wheel 90 assembled to wheel suspension system 100, according to some embodiments of the invention.

Figure 7:
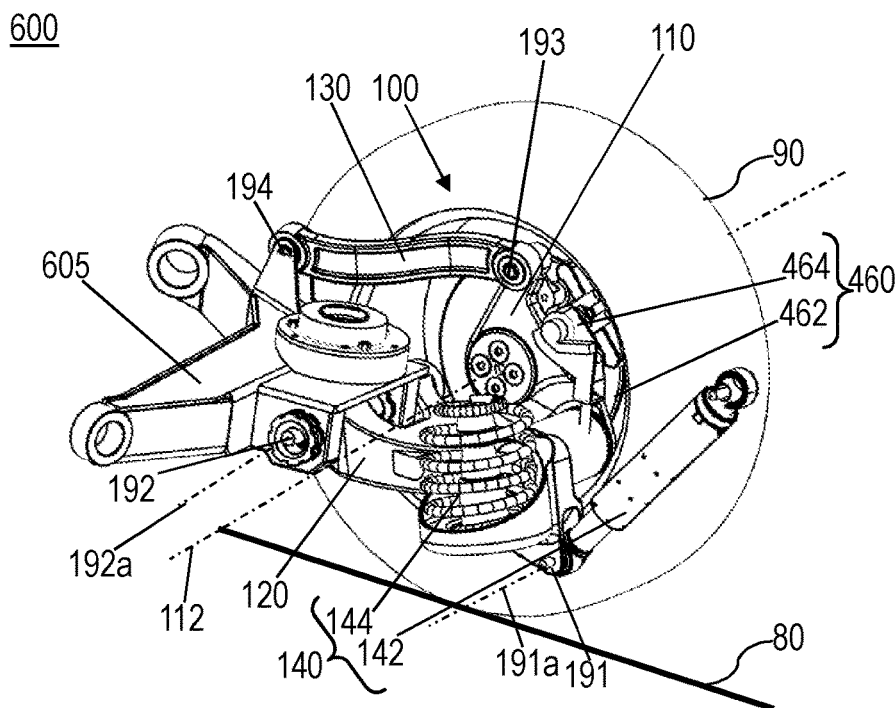
FIG. 7 is a schematic illustration of a corner assembly including a wheel suspension system with a motion restraining unit, a sub-frame and a braking unit, and of a wheel assembled to the wheel suspension system, according to some embodiments of the invention.

Reference is also made to FIG. 7, which is a schematic illustration of a corner assembly 600 including a wheel suspension system 100 with a motion restraining unit 140, a sub-frame 605, and a braking unit 460 and of a wheel 90 assembled to wheel suspension system 100, according to some embodiments of the invention.

In some embodiments, the length of arm 120 of wheel suspension system 100 is smaller than the diameter of the rim of wheel 90 to be assembled to wheel suspension system 100 such that entire arm 120 can be positioned within the rim without radially protruding external thereto. In some embodiments, the length of arm 120 of wheel suspension system 100 is greater than the radius of the rim of wheel 90 to be assembled to wheel suspension system 100.

In some embodiments, a ratio between (i) the distance between first axis 191a and second axis 192a in wheel suspension system 100 and (ii) the diameter of the rim of wheel 90 to be assembled to wheel suspension system 100 ranges between 50% and 90%.

In some embodiments, a ratio between (i) the distance between first axis 191a and second axis 192a and (ii) the desired maximal substantially linear travel distance of wheel interface 110/wheel interface axis 112 ranges between 40% and 70%.

In some embodiments, a ratio between (i) the distance between first axis and wheel interface axis 112 and (ii) the distance between first axis 191a and second axis 192a ranges between 10% and 55%.

Such ratios can, for example, provide a compact arm 120 that can be positioned within the rim of wheel 90 when wheel 90 is connected to wheel suspension system 100 (e.g., as shown in FIGS. 6 and 7) and provide substantially the same maximal travel distance of wheel interface 110/wheel interface axis 112 as a maximal travel distance thereof in typical suspension systems having suspension arms outside the rim of the wheel, even though arm 120 of wheel suspension 110 can be significantly shorter than suspension arms of typical suspension systems.

In some embodiments, a width of wheel suspension system 100 is a maximal distance between an inner lateral surface of arm 120 (e.g., surface that faces sub-frame 605/the reference frame of the vehicle) and an outer surface of wheel interface 110 (e.g., surface that faces wheel 90). In some embodiments, the width of wheel suspension system 100 ranges between 20% and 60% (e.g., 25% to 40%) of the maximal substantially linear travel distance of wheel interface axis 112.

In some embodiments, first axis 191*a* is offset with respect to wheel interface axis 112 along one or more axes perpendicular to wheel interface axis 112 of wheel suspension system 100 and towards a contact surface 80 of wheel 90 with the ground (e.g., as shown in FIGS. 6 and 7).

Reference is now made to FIGS. 8A, 8B and 8C, which are schematic illustrations of a wheel suspension system 700, according to some embodiments of the invention.

According to some embodiments of the invention, wheel suspension system 700 includes a wheel interface 710 and an arm 720.

Wheel interface 710 can connect a wheel thereto. Wheel interface 710 can have a wheel interface axis 712 about which the wheel can rotate when connected to wheel interface 710. Wheel interface 710 can have a wheel interface plane 714 in which the wheel can rotate when the wheel is connected to wheel interface 710.

In some embodiments, wheel suspension system 700 includes a wheel hub 716 connected to wheel interface 710 and rotatable about wheel interface axis 712. Wheel hub 716 can connect the wheel thereto.

Arm 720 can be connected to wheel interface 710 and can be rotatable with respect to wheel interface 710 about a first axis 791*a*. In some embodiments, arm 720 is connectable to the reference frame at its second end 721. In some embodiments, arm 720 is connected to wheel interface 710 using a first pivoting connection 791. First pivoting connection 791 is schematically shown in FIG. 8A and not shown in FIGS. 8B and 8C for sake of clarity.

In some embodiments, arm 720 is connectable to the reference frame of the vehicle and rotatable with respect to the reference frame about a second axis 792*a*. In some embodiments, arm 720 is connectable to the reference frame at its second end 722. In some embodiments, arm 720 is connectable to the reference frame using a second pivoting connection 792. Second pivoting connection 792 is schematically shown in FIG. 8A and not shown in FIGS. 8B and 8C for sake of clarity.

First axis 791*a* and second axis 792*a* can be off-parallel (e.g., non-parallel with respect to each other). For example, as shown in FIGS. 8A, 8B and 8C. This can, for example, enable setting a dynamic toe angle and/or a dynamic camber angle in wheel suspension system 100. In some embodiments, first axis 791*a* and second axis 792*a* are off-parallel with respect to wheel interface axis 712.

In some embodiments, first axis 791*a* is parallel (or substantially parallel) to wheel interface axis 712. In some embodiments, first axis 791*a* is off-parallel to wheel interface axis 712.

In some embodiments, second axis 792*a* is parallel (or substantially parallel) to wheel interface axis 712. In some embodiments, second axis 792*a* is off-parallel to wheel interface axis 712. In some embodiments, wheel interface axis 712 is movable along substantially a straight line (e.g., as described hereinabove).

In some embodiments, wheel suspension system 700 includes a linkage arm 730 (e.g., like linkage arm 130 described hereinabove).

Linkage arm 730 can be connected to wheel interface 710 and can be rotatable with respect to wheel interface 710 about a third axis 793*a*. In some embodiments, linkage arm 730 is connected to wheel interface 730 using a third pivoting connection 793. Third pivoting connection 793 is schematically shown in FIG. 8A and not shown in FIGS. 8B and 8C for sake of clarity.

Linkage arm 730 can be connectable to the reference frame of the vehicle and rotatable with respect to the reference frame about a fourth axis 794*a*. In some embodiments, linkage arm 130 is connectable to the reference frame using a fourth pivoting connection 794. Fourth pivoting connection 794 is schematically shown in FIG. 8A and not shown in FIGS. 8B and 8C for sake of clarity.

In some embodiments, third axis 793*a* is offset with respect to wheel interface axis 712 along axis 715*b* that is parallel (or substantially parallel) to the vehicle vertical axis when wheel suspension system 700 is assembled to the vehicle. In some embodiments, third axis 793*a* is aligned (or substantially aligned) with wheel interface axis 712 along axis 715*b* that is parallel (or substantially parallel) to the vehicle vertical axis when wheel suspension system 700 is assembled to the vehicle.

In some embodiments, wheel interface axis 712 is between first axis 791*a* and third axis 793*a* along axis 715*b* that is parallel (or substantially parallel) to the vehicle vertical axis when wheel suspension system 700 is assembled to the vehicle.

In some embodiments, fourth axis 794*a* is offset with respect to wheel interface axis 712 along axis 715*a* that is parallel (or substantially parallel) to the vehicle longitudinal axis and along axis 715*b* that is parallel (or substantially parallel) to the vehicle vertical axis when wheel suspension system is assembled to the vehicle.

In some embodiments, third pivoting connection 793 includes at least one of: one or more bushings and one or more spherical joints. In some embodiments, fourth pivoting connection 794 includes at least one of: one or more bushings and one or more spherical joints. Bushing(s) and/or spherical joint(s) can cause third axis 793*a* and/or fourth axis 794*a* to change their orientation with respect to wheel interface axis 712 when wheel interface 710 moves (e.g., to prevent locking of wheel suspension 700).

Linkage arm 730 can, for example, restrict motion of wheel interface 710. For example, linkage arm 730 can close one or more degrees of freedom of wheel interface 710 to cause wheel interface 710 to move in a plane that is parallel (or substantially parallel) to wheel interface plane 714 and eliminate, or substantially eliminate, motion of wheel interface 710 in other planes. Linkage arm 730 may, for example, constrain the rotation of wheel interface 710 about first axis 791*a*.

In various embodiments, linkage arm 730 causes a substantially linear motion of wheel interface axis 712 and/or causes wheel interface axis 712 to move along a substantially straight line. For example, linkage arm 730 can be shaped and sized, and the position of third axis 793a with respect to wheel interface axis 712 can be set to cause a substantially linear motion of wheel interface axis 712 and/or to cause wheel interface axis 712 to move along a substantially straight line. For example, offsetting third axis 793a with respect to wheel interface axis 712 (e.g., as shown in FIGS. 8A, 8B and 8C) can constrain the rotation of wheel interface 710 about first axis 791a so as to cause a substantially linear motion of wheel interface axis 712 and/or to cause wheel interface axis 712 to move along a substantially straight line.

In some embodiments, linkage arm 730 has a curved shape. In some embodiments, linkage arm 730 is curved in two perpendicular planes (e.g., one of which is perpendicular to wheel interface axis 712).

Wheel suspension system 700 can include at least some features of wheel suspension system 100 described hereinabove. For example, at least one of first axis 791a and second axis 792a can be offset with respect to wheel interface axis 712 along at least one axis that is perpendicular to the wheel interface axis 712 (e.g., as described hereinabove with respect to FIGS. 1A and 1B). Wheel suspension system 700 can, for example, include a motion restrainer unit (e.g., like motion restrainer unit 140 described above with respect to FIGS. 1A and 1B). Wheel suspension system 700 can include other features of wheel suspension system 100.

Some embodiments of the present invention can provide a corner assembly including wheel suspension system 700 at least one of: a sub-frame (e.g., such as sub-frame 205 described hereinabove), a powertrain unit (e.g., such as powertrain unit 350 described hereinabove) and a braking unit (e.g., such as braking unit 460 described hereinabove).

Some embodiments of the present invention can provide a vehicle including two or more wheel suspension systems described hereinabove (e.g., such as wheel suspension systems 100, 700). Some embodiments of the present invention can provide a vehicle including two or more vehicles corner modules described hereinabove. In some embodiments, the vehicle can include two or more wheels assembled to the wheel suspension systems. The vehicle can, for example, be a passenger car, a commercial vehicle, a sport utility vehicle, an electrical car, a van, etc.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A wheel suspension system comprising:
   a wheel interface having a wheel interface axis about which a wheel rotates when connected to the wheel interface; and
   an arm connected to the wheel interface and rotatable with respect to the wheel interface about a first axis, the arm is connectable to a reference frame of a vehicle and rotatable with respect to the reference frame about a second axis; wherein the second axis is substantially parallel to the first axis; wherein the first axis and the second axis are positioned within a diameter of a wheel when the wheel is assembled to the wheel interface; and
   wherein the first axis and the second axis are offset with respect to the wheel interface axis.

2. The wheel suspension system of claim 1, wherein the first axis is offset with respect to the wheel interface axis along at least one axis that is perpendicular to the wheel interface axis.

3. The wheel suspension system of claim 1, wherein the second axis is offset with respect to the wheel interface axis along at least one axis that is perpendicular to the wheel interface axis.

4. The wheel suspension system of claim 1, wherein the wheel interface axis is between the first axis and the second axis along at least one axis that is perpendicular to the wheel interface axis.

5. The wheel suspension system of claim 1, wherein at least one of the first axis and the second axis are off-parallel with respect to the wheel interface axis.

6. The wheel suspension system of claim 1, wherein the wheel interface axis is movable along a substantially straight line.

7. The wheel suspension system of claim 1, comprising a linkage arm connected to the wheel interface and rotatable with respect to the wheel interface about a third axis, the linkage arm is connectable to the reference frame and rotatable with respect to the reference frame about a fourth axis.

8. The wheel suspension system of claim 7, wherein the third axis and the fourth axis are offset with respect to the wheel interface axis.

9. The wheel suspension system of claim 1, wherein a distance between the first axis and the second axis is smaller than a diameter of a rim of the wheel to be assembled to the wheel suspension system.

10. The wheel suspension system of claim 1, wherein a distance between the first axis and the second axis is greater than a radius of a rim of the wheel to be assembled to the wheel suspension system.

11. The wheel suspension system of claim 1, wherein the arm is rotatable in a plane that is substantially perpendicular to the wheel interface axis.

12. The wheel suspension system of claim 1, wherein the arm is positioned within a diameter of a rim of the wheel when the wheel is assembled to the wheel suspension system.

13. The wheel suspension system of claim 1, wherein a ratio between (i) a distance between the first axis and the second axis, and (ii) a maximal substantially linear travel distance of the wheel interface axis ranges between 40% and 70%.

14. The wheel suspension system of claim 1, wherein a ratio between (i) a distance between the first axis and the wheel interface axis and (ii) a distance between the first axis and the second axis ranges between 10% and 55%.

15. The wheel suspension system of claim 1, wherein a ratio between (i) a distance between the first axis and the second axis, and (ii) a diameter of a rim of the wheel to be assembled to the wheel suspension system ranges between 50% and 90%.

16. The wheel suspension system of claim 1, comprising a motion restraining unit, wherein the motion restraining unit comprises at least one spring and at least one damper, and wherein the motion restrainer unit interconnecting at least one of the wheel interface and the arm with the reference frame.

17. A corner assembly comprising:
a sub-frame to connect the corner assembly to a reference frame of a vehicle;
a wheel interface having a wheel interface axis;
a wheel hub connected to the wheel interface and rotatable with respect to the wheel interface about the wheel interface axis, wherein the wheel interface axis is an axis about which the wheel rotates when connected to the wheel hub; and
an arm connected to the wheel interface and rotatable with respect to the wheel interface about a first axis, the arm is connectable to the sub-frame and rotatable with respect to the sub-frame about a second axis; wherein the second axis is substantially parallel to the first axis; wherein the first axis and the second axis are positioned within a diameter of a wheel when the wheel is assembled to the wheel hub; and
wherein the first axis and the second axis are offset with respect to the wheel interface axis.

18. The corner assembly of claim 17, comprising a powertrain unit, the powertrain unit comprises:
a drivetrain shaft connected to the wheel hub to rotate the wheel hub about the wheel interface axis; and
a motor for generating rotations, wherein the motor is coupled to the drivetrain shaft to rotate the drivetrain shaft.

19. The corner assembly of claim 18, wherein the drivetrain shaft and the motor are positioned between the wheel interface and the sub-frame.

* * * * *